United States Patent [19]

Heckel, Jr. et al.

[11] Patent Number: 4,617,351

[45] Date of Patent: Oct. 14, 1986

[54] MELT EXTRUDABLE COMPOSITION OF PERFLUOROCARBON POLYMERS

[75] Inventors: Thomas A. Heckel, Jr., Hockessin, Del.; Felice J. Rizzo, Mt. Pleasant, S.C.

[73] Assignee: E. I. Du Pont de Nemours and Company, Wilmington, Del.

[21] Appl. No.: 811,109

[22] Filed: Dec. 19, 1985

[51] Int. Cl.$^4$ .................. C08L 27/12; C08L 23/16; C08L 27/18

[52] U.S. Cl. .................................. 525/199; 525/200

[58] Field of Search ............................. 525/199, 200

[56] References Cited

U.S. PATENT DOCUMENTS 3,125,547  3/1964  Blatz ................................ 260/45.5
3,334,157  8/1967  Larsen .............................. 525/199
3,519,703  7/1970  Merkl et al. ...................... 525/199
3,940,455  2/1976  Kaufman .......................... 525/199
4,489,113  12/1984 Ueno ................................ 525/199

FOREIGN PATENT DOCUMENTS 002561   1/1976  Japan .
016638   2/1976  Japan .
1120131  7/1968  United Kingdom .
938098   6/1980  U.S.S.R. .
235641   1/1981  U.S.S.R. .

Primary Examiner—Carman J. Seccuro

[57] ABSTRACT

In this invention the extrusion rate of melt extrudable thermoplastic perfluorocarbon polymers is enhanced by the addition of up to 1% by weight of a hydrocarbon polymer.

6 Claims, No Drawings

MELT EXTRUDABLE COMPOSITION OF PERFLUOROCARBON POLYMERS

BACKGROUND OF THE INVENTION

This invention relates to perfluorocarbon polymers of improved processibility, and especially improved melt extrusion rates. The practical extrusion rate of melt extrudable perfluorocarbon polymers is limited by melt fracture of the polymer. The onset of melt fracture is the extrusion rate at which the molten polymer begins to shear along the inside wall of the extruder, causing rough surfaces on the extrudate. It is desirable to increase the useful extrusion rate and some prior research has addressed this matter by modifying the perfluorocarbon polymer through polymerizing the fluoromonomer with comonomers designed to increase the rate without occurrence of melt fracture.

SUMMARY OF THE INVENTION

In this invention the extrusion rate of melt extrudable thermoplastic perfluorocarbon polymers having a melt viscosity of between $1 \times 10^2$ and $1 \times 10^6$ Pa.S, is enhanced by the addition of up to 1% by weight of at least one hydrocarbon polymer.

DETAILED DESCRIPTION OF THE INVENTION

The perfluorocarbon copolymers useful in the practice of the subject invention include those melt-extrudable copolymers formed by copolymerization of tetrafluoroethylene with at least one perfluorinated ethylenically unsaturated comonomer. Useful comonomers include those of the formulae

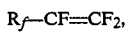

$R_f-CF=CF_2$,

$R_f-O-CF=CF_2$, or mixtures thereof,
wherein $R_f$ is perfluorinated alkyl of 1 to 8 carbon atoms inclusive. Preferably $R_f$ is perfluorinated normal alkyl of 1 to 3 carbon atoms inclusive.

Most preferred are those copolymers formed by the copolymerization of tetrafluoroethylene with 5 to 17 weight % hexafluoropropylene or 1 to 12.5 weight % perfluoro(propyl vinyl ether) to form the dipolymer, or a combination of these comonomers to form the terpolymer (as used herein, percentages of comonomer are in weight percent). These copolymers generally have specific melt viscosities of $1 \times 10^2$ to $1 \times 10^6$ Pa.S at 372° C., and thus are melt extrudable (i.e., can be extruded into articles by melting and shaping). Of course, the crystalline melting point of any of the copolymers depends upon the amount of comonomer present. Generally speaking, the more such comonomer present, the lower the crystalline melting point. These copolymers also have second order transition temperatures of 85° to 10° C. (Both crystalline melting point and second order transition temperature are measured using conventional differential scanning calorimetry. The melting point is the peak of the endotherm in the scan).

The hydrocarbon polymers which are added to fluorocarbon polymers comprise, in general, any elastomeric or thermoplastic hydrocarbon polymer obtained by the polymerization of monoolefins having the general structure $CH_2=CHR$, where R is hydrogen or an alkyl radical. "Thermoplastic" means the polymer can be melted and extruded without degradation. "Elastomeric" means that the polymer will resume substantially its original shape after being stretched at least 1½ times its original length. In general, the alkyl radical contains up to 8 carbon atoms. In particular, the hydrocarbon polymers can be represented by polyethylene, both the high density type and the low density type, polypropylene, polybutene-1, poly(3-methylbutene), poly(4-methylpentene), and copolymers of ethylene with higher olefins, e.g. propylene, butene-1, octene-1, decene-1, octadecene-1, etc. The term "hydrocarbon polymer" is also intended to include modified polyolefins which contain small concentrations of up to 10 mol percent of units derived from dienes or polar monomers such as vinyl acetate, ethyl acrylate, dienes etc. Similarly, the invention is also applicable to blends of hydrocarbon polymers, and hydrocarbon polymers containing additives such as antioxidants, light stabilizers, pigments, etc.

The hydrocarbon polymer preferably has a melt flow between 0.01 and 1000, preferably 0.5–100, g/10 minutes measured by ASTM D1238 at 190° C. A preferred hydrocarbon polymer is a polyethylene.

The addition of the hydrocarbon polymer can be accomplished by any of the means heretofore developed for the addition of additives to fluoropolymers. Thus the hydrocarbon polymer can be added to the perfluorocarbon polymer in a compounding mill, in a Banbury mixer, or a mixing extruder in which the hydrocarbon polymer is uniformly distributed throughout the perfluorocarbon polymer. The mixing operation is conveniently carried out at a temperature above the melting point of the polymer. It is also feasible to blend the two polymers in the solid state and then cause uniform distribution of the hydrocarbon polymer by passing the blend through a melt extruder, such as is employed in fabrication.

The effect of the hydrocarbon polymer occurs at low levels of incorporation, i.e., the lower limit is any amount in which an increase in extrusion rate occurs before electrical flaws are observed, as compared to the same perfluorocarbon polymer but not containing any hydrocarbon polymer. Generally, this will be about 0.001 to 1% by weight, preferably 0.01 to 0.1%. Higher concentrations will increase extrusion rates but pumping capacity deterioration over a period of time is a concern. The range prescribed herein does not result in loss of pumping capacity.

The invention is illustrated by the following examples.

EXAMPLE 1

A telephone primary wire construction was made on a 31.75 mm Waldron Hartig extruder. This construction was used to evaluate resins in all the examples. The telephone primary construction was 0.511 mm copper wire substrate with 0.127 mm of insulation.

A blend was prepared by extrusion compounding a copolymer of tetrafluoroethylene and hexafluoropropylene (TFE/HFP, 89/11 wt. %), viscosity $8.18 \times 10^3$ Pa.s, with 200 parts per million (ppm) of an ethylene/propylene/1,4 hexadiene (EPDM) (53/44/3 wt. %) rubber having a melt flow of 2.8 g/10 minutes. Another blend was prepared by extruding the same copolymer with 500 ppm of the same copolymer of ethylene/propylene/1,4 hexadiene.

Each resin was tested using the same extrusion temperature profile and crosshead tooling. The profile was as follows: rear barrel 360° C., center barrel 371° C., front barrel 371° C., adapter 382° C., and crosshead 393° C. This relatively cool temperature profile was used to try to prevent the EPDM from degrading.

The resins were tested, with the following results:

A. A control of the TFE/HFP copolymer having no additive was extruded first onto the wire. The melt temperature of the resin was 381° C. and the pressure in the crosshead was 12.8 MPa. This resin ran at a 1.65 meters/second (m/s) line speed before the number of electric flaws became too great (more than 1 per minute).

B. The 200 ppm EPDM blend was tried next. A 392° C. melt temperature was recorded during the run. The higher melt temperature was accounted for by the higher screw speed used to obtain output. The crosshead pressure was correspondingly higher, reading 17.24 MPa. Line speed for this trial was 2.95 m/s, an 80% increase in rate before electrical flaws developed at a rate of more than 1 per minute.

C. The second blend tried was the 500 ppm EPDM blend. Melt temperature for the trial was 385° C. and crosshead pressure was 17.24 MPa. The line speed for the sample was 3.18 m/s before electrical flaws developed, which is a 90% increase over the control.

Calculations show that the control started melt fracture at a shear rate of 37/sec. flowing through the 10.7 mm die and 7.0 mm tip while the 200 ppm blend and the 500 ppm blend melt started fracture at 67/sec. and 72/sec. shear rates, respectively. These shear rates were low because of the low temperature profile, but they demonstrated the relative difference between the resins.

Electrical flaws are detected by passing the insulated wire through a selectable voltage potential set-up by charging a string of metallic beads. As the wire passes through the strings of beads any flaw in the wire insulation will allow the voltage potential to arc to the wire conductor. The arc is sensed and counted. A flaw rate of greater than one per minute is unacceptable.

EXAMPLE 2

A 50.8 mm Davis Standard extruder was set-up to run 0.511 mm wire with a 0.127 mm insulation. This construction was used to evaluate the high speed potential of resins.

A mixing head screw that provided even dispersion of the additive was used in the 50.8 mm extruder.

The trials were set-up to run each candidate under similar conditions. A 80:1 drawdown was used (6.7 mm die, 4.4 mm tip) for each candidate except where noted.

A. The TFE/HFP control with a nominal melt viscosity of $8.1 \times 10^3$ Pa.s was run first onto the 0.511 mm wire. The control ran at 3.3 meters/second (m/s) before electrical flaws exceeded 1 per minute. The profile used was: rear 382° C., center 393° C., front 399° C. clamp 418° C., adaptor 416° C., crosshead 418° C., die 418° C. Melt temperature of the resin was 405° C.

B. The first blend tried was one containing the EPDM described in Example 1. The EPDM was introduced into the TFE/HFP resin by a concentrate letdown 25:1 to give a 500 ppm loading. The blend ran at 8.89 m/s with tip melt fracture observed to be equivalent to what the control had at 3.30 m/s. Flaw rate of the wire run was low, therefore wire preheat was thought to be the limit of further line speed increases. Maximum wire preheat at this line speed was 210° C. Melt temperature of the blend was 409° C. The line speed was increased 270% over that of the control before electrical flaws reached 1 per minute.

C. A high density polyethylene (HDPE), melt flow 2.8 g/10 min, Alathon ® 7030 additive was evaluated. A 500 ppm loading of the additive was used in the same TFE/HFP resin. The HDPE extrusion was very similar to the EPDM extrusion. The same decrease in shear could be observed by noting the higher line speed which melt fracture appeared. This blend ran at 9.14 m/s with only 7 flaws in a thirty minute run. Maximum preheat of wire at this line speed was 204° C. which made it necessary to run a long melt cone.

D. A trial with a higher melt flow TFE/HFP resin was also conducted. It had a nominal melt viscosity of $3.0 \times 10^3$ Pa.s. This resin ran onto wire very smoothly at 7.62 m/s. 500 ppm of the EPDM was then added to the resin as a concentrate. The resulting blend's line speed went to 10.67 m/s before electrical flaws exceeded 1 per minute.

The higher line speed of TFE/HFP when blended with EPDM or HDPE was demonstrated in this experiment.

EXAMPLE 3

Comparisons with Various Additives

Shear stress was measured as a function of shear rate for a series of blends of TFE/HFP resins with several additive hydrocarbon polymers. An Instron Capillary Rheometer was used with test procedure ASTM D1703. Capillary diameter was 0.1273 cm, capillary length was 5.08 cm, and test temperature was 400° C. Blends used were the following:

Control
  TFE/HFP resin described in Example 1
Example 3-1 blend
  TFE/HFP resin containing 500 ppm EPDM (The same blend used in Example 2D)
Example 3-2 blend
  The TFE/HFP resin containing 500 ppm EPDM (the same blend used in Example 1C)
Example 3-3 blend
  The TFE/HFP resin containing 500 ppm "Alathon" T030 polyethylene resin
Comparison
  The TFE/HFP resin containing 500 ppm of a copolymer of 60% vinylidene fluoride ($CF_2=CH_2$) and 40 hexafluoropropylene ($CF_3-CF=CF_2$).

Results of running these blends in the Instron test machine showed that the critical shear rate at which melt fracture occurs was much higher for the Example blends than for the Control or for the Comparisons. The table below shows the results. Column 1 shows shear rate in 1/sec from 90 to 1500 1/sec. The remaining columns give, for each blend, the shear stress, i.e., the load causing the stress, in kPa for each particular shear rate. The S and R designation after each shear stress value indicates whether the extrudate had a smooth or rough surface as it exits the capillary.

Interpreting the Table, it is seen that for the TFE/HFP Control melt fracture was exhibited (shown by the R) at a shear rate of only 300 1/sec; whereas for Example 3-1 blend, melt fracture did not occur until the shear rate reached 750 1/sec. It is also seen from the comparison that when the additive does not contain hydrocarbon units the blend was not as effective.

TABLE

| SHEAR RATE | FEP 100 | EXAMPLE BLEND 3-1 | 3-2 | 3-3 | COMPARISON |
|---|---|---|---|---|---|
| 90 | 170 S | 28 S | 35 S | 51 S | 101 S |
| 150 | 227 S | 62 S | 53 S | 86 S | 167 S |
| 225 | 277 S | 87 S | 77 S | 120 S | 300 R |
| 300 | 328 R | 113 S | 101 S | 164 S | 335 R |
| 450 | 546 R | 215 S | 273 S | 304 S | |
| 750 | | 507 R | 585 R | 546 R | |
| 1500 | | 702 R | | | |

S = smooth surface
R = rough surface
SR = transition between smooth and rough

We claim:

1. A melt extrudable thermoplastic perfluorocarbon polymer having a melt viscosity of between $1 \times 10^2$ and $1 \times 10^6$ Pa.s containing up to about 1 percent by weight of a hydrocarbon polymer, said hydrocarbon polymer being present in an amount which results in an increased extrusion rate before electrical flows are observed, as compared to the same perfluorocarbon polymer not containing any hydrocarbon polymer.

2. The polymer of claim 1 wherein the hydrocarbon polymer contains units derived from $CH_2=CHR$ wherein R is hydrogen or alkyl of up to 8 carbon atoms.

3. The composition of claim 1 or 2 wherein the perfluorocarbon polymer is a copolymer of tetrafluoroethylene and hexafluoropropylene.

4. The composition of claim 1 or 2 wherein the hydrocarbon polymer is a copolymer of ethylene/propylene/diene or a copolymer of ethylene/propylene.

5. The composition of claim 1 or 2 wherein the hydrocarbon polymer is polyethylene.

6. The composition of claim 3 wherein the hydrocarbon polymer is polyethylene or a copolymer of ethylene/propylene/1,4-hexadiene.

* * * * *